(No Model.) 2 Sheets—Sheet 1.

S. A. POLITSKY.
WATER SUPPLY APPARATUS.

No. 546,595. Patented Sept. 17, 1895.

Witnesses:
A. D. Harrison
Rollin Abell

Inventor:
S. A. Politsky
by Wright Brown & Quinby
Attys.

ANDREW B.GRAHAM. PHOTO-LITHO. WASHINGTON.D.C.

(No Model.) 2 Sheets—Sheet 2.
S. A. POLITSKY.
WATER SUPPLY APPARATUS.
No. 546,595. Patented Sept. 17, 1895.
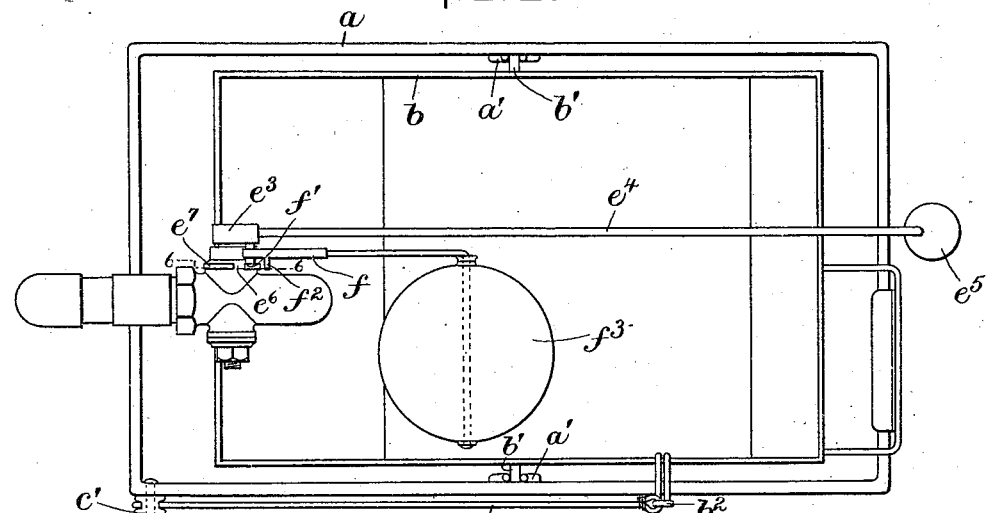
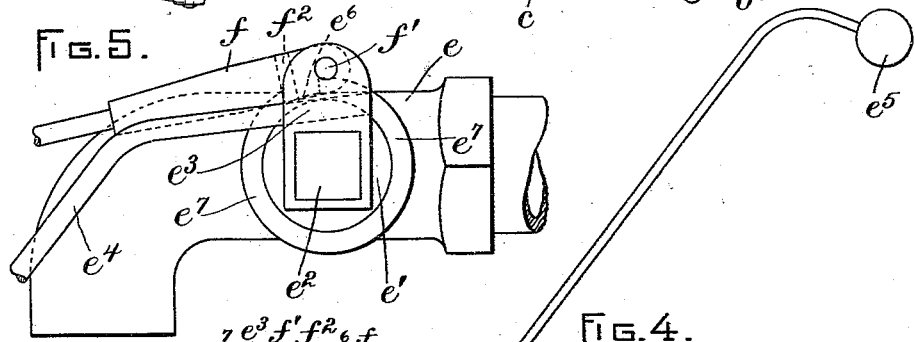
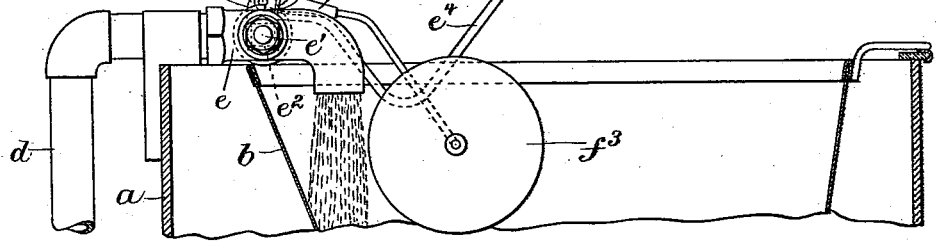
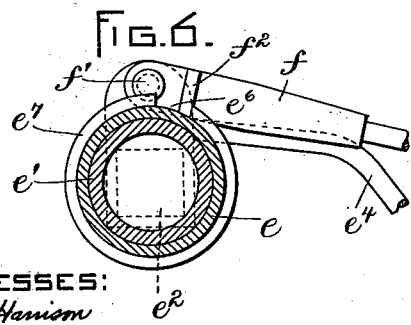
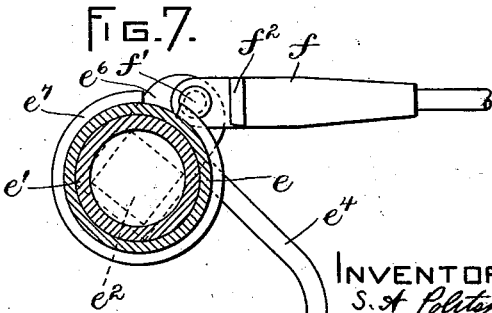
WITNESSES:
A. D. Harrison
Rollin Abell
INVENTOR:
S. A. Politsky

UNITED STATES PATENT OFFICE.

SIMON A. POLITSKY, OF BOSTON, MASSACHUSETTS.

WATER-SUPPLY APPARATUS.

SPECIFICATION forming part of Letters Patent No. 546,595, dated September 17, 1895.

Application filed January 21, 1895. Serial No. 535,677. (No model.)

*To all whom it may concern:*

Be it known that I, SIMON A. POLITSKY, of Boston, in the county of Suffolk and State of Massachusetts, have invented certain new and useful Improvements in Water-Supply Apparatus, of which the following is a specification.

This invention has for its object to provide a simple and effective means for supplying a water-closet bowl with a quick and ample wash; and it consists in the improvements which I will now proceed to describe and claim.

Figure 1:
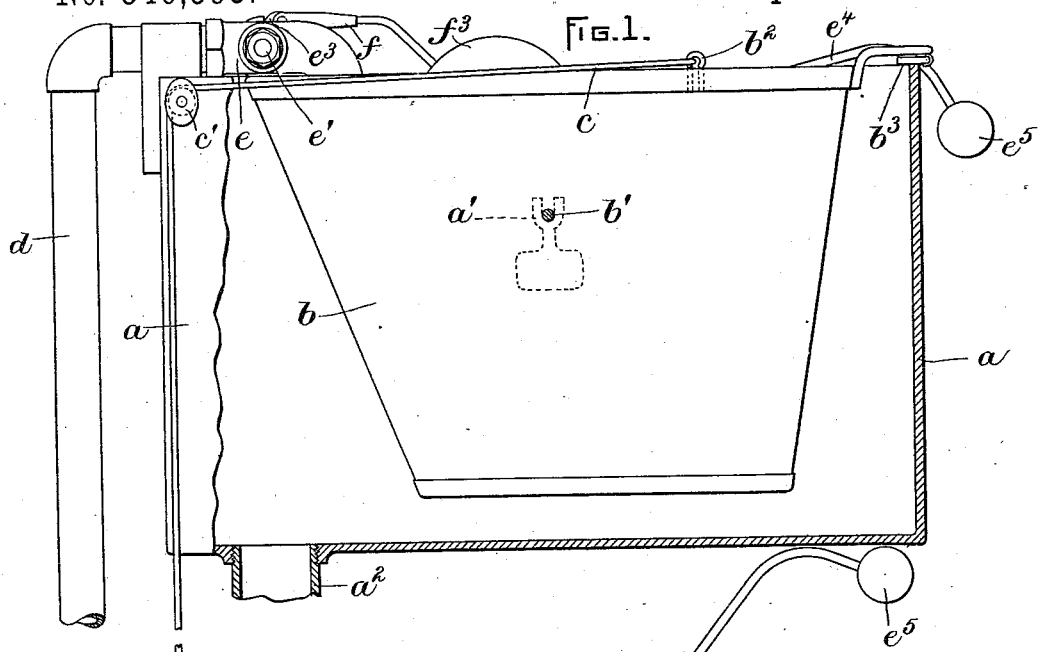
Figure 2:
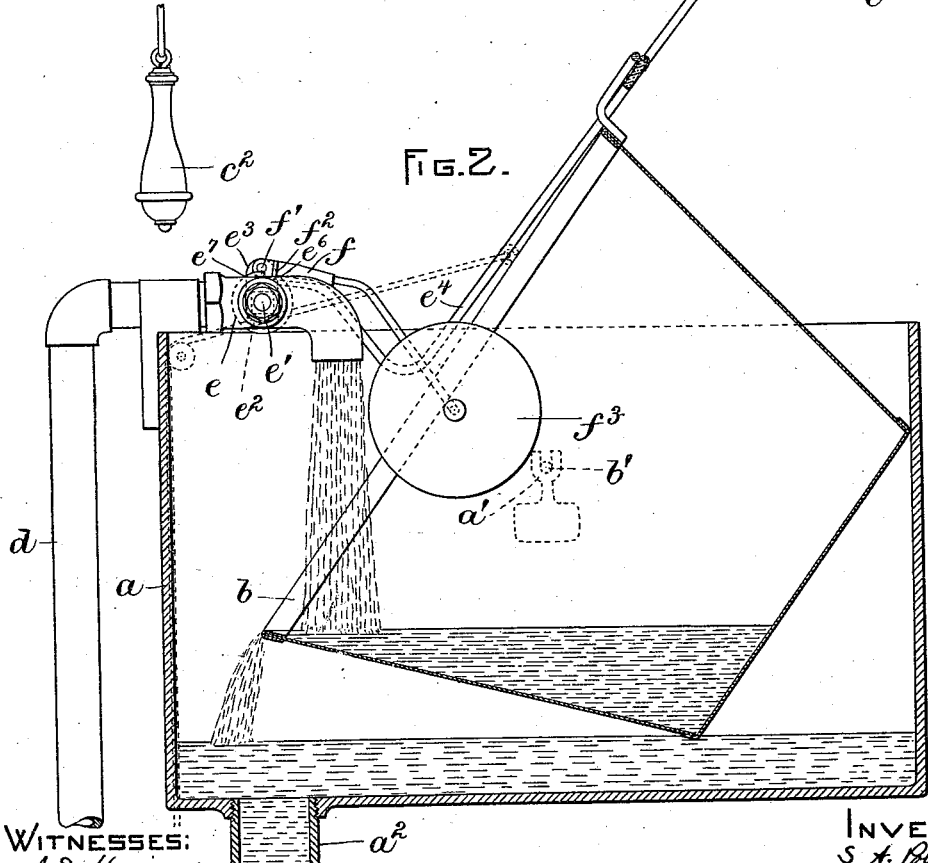

In the accompanying drawings, Figure 1 is a side elevation of my improved apparatus with the outer tank broken away and showing partly in section. Fig. 2 is a longitudinal section showing the inner tank or bucket tipped on its pivot in the act of discharging the water into the outer tank. Fig. 3 is a plan view with the parts shown in the same position as in Fig. 1. Fig. 4 is a partial longitudinal section showing the valve mechanism in the same position as in Fig. 2, but with the inner tank or bucket returned to its normal position. Fig. 5 is an enlarged detail side elevation of the cock and attached parts. Fig. 6 is a sectional detail taken on the line 6 6 of Fig. 3, but with the valve-operating mechanism in the position shown in Fig. 4. Fig. 7 is a similar view with the valve-operating mechanism in the position shown in Fig. 1.

The outer tank $a$, made of cast-iron, tin, or other suitable material, surrounds the inner tank or bucket $b$, which is supported by the trunnions $b'$ $b'$, which rest upon supports $a'$ $a'$, affixed to the outer tank $a$. The inner tank or bucket $b$ swings loosely on the trunnions $b'$ $b'$, and has attached to its side an eye $b^2$, which extends over the side of the outer tank $a$. To the eye $b^2$ is attached a cord or chain $c$, which runs through a pulley $c'$ and has a handle $c^2$ at its end. The bucket $b$ normally contains a charge of water and may be tipped to discharge the water into the outer tank by means of the handle $c^2$ and chain $c$. The tank $a$ has an outlet-pipe $a^2$, communicating with a water-closet bowl or hopper. Water is supplied to the bucket $b$ by the supply-pipe $d$, which has a cock $e$ arranged over the bucket. The valve-plug $e'$ of the cock $e$ has a square end $e^2$, to which is fitted a lug $e^3$. A rod $e^4$ is rigidly secured to the lug $e^3$, and has at its end a weight $e^5$, which tends to keep the valve-plug $e'$ in such a position as to prevent the flow of water through the cock. An arm $f$ is loosely connected by a pin $f'$ to the lug $e^3$ and has a latch $f^2$, which is adapted to engage a fixed detent, which may be the end of a notch $e^6$ in the flange $e^7$, which is formed on the cock $e$. A float $f^3$ is connected to the arm $f$, and is adapted to raise the latch $f^2$ from the notch $e^6$ when the water in the bucket reaches to a sufficient height. The rod $e^4$ rests upon the edge of the bucket $b$, and when said bucket is tipped in the position shown in Fig. 2 it changes the angle of the rod $e^4$, which, being positively connected to the valve-plug $e'$ through the lug $e^3$, turns said valve-plug in such a position that the port in it registers with the opening in the cock, thus allowing the water to flow into the bucket $b$. As the lug $e^3$ is turned to this position by the rod $e^4$ it carries with it the arm $f$, whose latch $f^2$ bears upon the flange $e^7$ until it reaches the notch $e^6$, when said latch falls into engagement with the latter. When the bucket $b$ is allowed to return to its normal position, with the rubber lip $b^3$ bearing on the edge of the outer tank $a$, the valve-operating mechanism is held in the position shown in Fig. 4, allowing the water to flow into the bucket $b$. When the water rises to a sufficient height in the bucket $b$, it floats the ball $f^3$, the latter raising the arm $f$ and displacing the latch $f^2$, thus allowing the valve-plug $e'$ to be turned by the falling of the weighted arm or rod $e^4$. By this operation all the parts are returned to the positions shown in Fig. 1, the bucket $b$ being nearly full of water and ready for the operation to be repeated.

The position of the parts attached to the cock $e$, as shown in Fig. 4, can be more clearly understood by reference to Fig. 5, which is a detail of the cock $e$ and attached parts, looking at the opposite side shown in Fig. 4. The sectional detail, Fig. 6, shows the valve-plug $e'$ and the surrounding portion of the cock $e$ in section, with the notched flange $e^7$ and other parts in elevation in the same position as in Fig. 5, and Fig. 7 shows the valve mechanism returned to its normal position with the valve closed.

I claim—

1. A water-supply apparatus comprising a water-supply pipe, a pivoted bucket arranged to receive water from said pipe, means such as a cord and pull whereby the bucket may be tipped to discharge its contents, a fixed detent, a valve controlling said pipe and provided with a valve-opening and arranged to be actuated by the bucket when the latter is tipped, and with a latch which automatically engages said detent and holds the arm in its valve-opening position, and a float connected with said latch and arranged to be actuated by the accumulation of water in the bucket to displace the latch and release the arm, the latter being weighted so that when released it closes the valve.

2. A water-supply apparatus comprising a tank having an outlet pipe, a pivoted bucket mounted to swing in the tank, a water-supply pipe arranged to deliver water to the bucket, means such as a cord and pull connected with the bucket whereby the latter may be tipped to discharge its charge of water into the tank, a fixed detent, a valve in the supply-pipe having a weighted arm projecting over the bucket and adapted to be raised by the discharging movement of the latter and thus open the valve, a latch pivoted to the valve and adapted to engage said detent, and an arm connected with the latch and provided with a float which is arranged to be raised by the water in the bucket and to displace the latch, thereby releasing the weighted arm and permitting the latter to close the valve.

In testimony whereof I have signed my name to this specification, in the presence of two subscribing witnesses, this 11th day of January, A. D. 1895.

SIMON A. POLITSKY.

Witnesses:
C. F. BROWN,
A. D. HARRISON.